United States Patent
Speranza et al.

(10) Patent No.: US 12,127,572 B2
(45) Date of Patent: Oct. 29, 2024

(54) SULFITE-FREE, RAPID SETTING, THERMAL-REVERSIBLE MODIFIED POTATO STARCH GELLING AGENT AND PRODUCTS MADE THEREFROM

(71) Applicant: Corn Products Development, Inc., Westchester, IL (US)

(72) Inventors: Adrianne Speranza, Bridgewater, NJ (US); Christopher Lane, Bridgewater, NJ (US); Xin Yang, Bridgewater, NJ (US); Senthil Ganesh, Bridgewater, NJ (US); Maryvonne Fuentes, Bridgewater, NJ (US); Keith Stanckiewitz, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 1009 days.

(21) Appl. No.: 16/604,521

(22) PCT Filed: Apr. 10, 2018

(86) PCT No.: PCT/US2018/026852
§ 371 (c)(1),
(2) Date: Oct. 10, 2019

(87) PCT Pub. No.: WO2018/191242
PCT Pub. Date: Oct. 18, 2018

(65) Prior Publication Data
US 2020/0146324 A1    May 14, 2020

Related U.S. Application Data

(60) Provisional application No. 62/483,715, filed on Apr. 10, 2017.

(51) Int. Cl.
*A23L 29/219* (2016.01)
*A23C 20/00* (2006.01)
*C08B 31/18* (2006.01)

(52) U.S. Cl.
CPC ............ *A23L 29/219* (2016.08); *C08B 31/18* (2013.01); *A23C 20/00* (2013.01)

(58) Field of Classification Search
CPC ......... A23L 29/219; C08B 31/18; C08L 3/10; A23C 20/00
USPC .............................................. 514/60; 426/578
See application file for complete search history.

(56) References Cited

U.S. PATENT DOCUMENTS

| | | |
|---|---|---|
| 4,499,116 A | 2/1985 | Zwiercan et al. |
| 4,608,265 A | 8/1986 | Zwiercan et al. |
| 5,807,601 A | 9/1998 | Carpenter et al. |
| 6,322,632 B1 | 11/2001 | McClain |
| 6,617,447 B2 | 9/2003 | Gnad et al. |
| 6,777,548 B1 | 8/2004 | Kesselmans et al. |
| 8,936,820 B2 | 1/2015 | Dournel |
| 2013/0122177 A1 | 5/2013 | Fannon et al. |

FOREIGN PATENT DOCUMENTS

| | | | |
|---|---|---|---|
| CA | 1 244 278 | 11/1988 | |
| CN | 1261457 C | 8/2003 | |
| CN | 1580076 | 8/2003 | |
| CN | 101857641 | 6/2010 | |
| CN | 105777918 | 3/2016 | |
| EP | 0 149 258 A2 | 7/1985 | |
| EP | 0 857 178 | 4/1997 | |
| EP | 2 636 311 A1 | 3/2013 | |
| GB | 1 095 268 | 12/1967 | |
| WO | WO-2016210228 A1 * | 12/2016 | ............. A23C 20/00 |

OTHER PUBLICATIONS

Smigielska et al. (Acta Physica Polonica A vol. 108, No. 2 (2005), 303-310).*
Fonseca et al. (LWT—Food Science and Technology 60 (2015) 714-720).*
Pojic et al. (Eur Food Res Technol (2013) 237:299-307).*
Gelski (https://www.bakingbusiness.com/articles/43786-new-starch-ingredient-replaces-casein; Jun. 5, 2012).*

\* cited by examiner

*Primary Examiner* — Layla D Berry

(57) ABSTRACT

This specification discloses a potato starch modified to have a narrow carboxylation and viscosity profile, and sulfite levels that are below detection levels by titration. The disclosed starch forms thermal-reversible gels having a fast gelling rate and that are useful in imitation cheese.

10 Claims, No Drawings

SULFITE-FREE, RAPID SETTING, THERMAL-REVERSIBLE MODIFIED POTATO STARCH GELLING AGENT AND PRODUCTS MADE THEREFROM

CROSS-REFERENCE TO RELATED APPLICATION

This application is a U.S. National Phase application which claims priority to PCT/US2018/26852, filed Apr. 10, 2018, which claims priority to U.S. Provisional Application Ser. No. 62/483,715, filed Apr. 10, 2017, both of which are incorporated by reference herein in their entirety. The present invention relates to a modified potato starch having a specific percentage carboxylation that can be further characterized by its specific viscosity profile. The starch produces thermal-reversible gels having gelling and melting characteristics that make the starch a suitable protein replacement in imitation cheese products.

The present invention relates to a modified potato starch having a specific percentage carboxylation that can be further characterized by its specific viscosity profile. The starch produces thermal-reversible gels having gelling and melting characteristics that make the starch a suitable protein replacement in imitation cheese products.

In embodiments the oxidized potato starch can be characterized by having a level of carboxyl substitution (% d.s.b.) of between about 0.35 and about 0.70, in embodiments between about 0.45 and about 0.60, in embodiments between about 0.50 and about 0.55.

In embodiments the modified starch can be characterized as having a peak viscosity of between about 100 and 220 cP, in other embodiments between 120 cP and 200 cP. In embodiments the modified starch can be characterized as having a final viscosity of between 45 and 100 cP, in embodiments between about 50 and 75 and in embodiments between 60 and 75 cP.

In embodiments the oxidized starch can be characterized by forming thermal reversible gels at 20% (d.s.b.) and having a gel punch force, of at least 150 g after one day's storage at 4° C., in embodiments between 175 and about 300 g. In embodiments the gel will have a gel punch force, of at least 275 g after seven days storage at 4° C., in embodiments between 275 g and 450 g, in embodiments between about 300 g and about 400 g.

In embodiments the starch has a gelling rate, represented by the time for the elastic modulus, G', of a 20% (d.s.b.) starch slurry to reach >100 Pa, of less than about 30 min, in embodiments less than about 20 min, in embodiments less than about 10 min, in embodiments between about 1 and about 10 minutes, and in other embodiments between about 3 and 10 minutes.

In embodiments the gel has an onset melting temperature of between about 35° C. and about 55° C., in embodiments between about 40° C. and 50° C., in other embodiments between about 42.5° and 47.5° C. In embodiments the gel has a completed melting temperature of between about 65° C. and about 85° C., in embodiments between about 67.5° C. and about 80° C. in embodiments between 68° and 75° C., and in embodiments between about 69° and 73° C.

In embodiments an imitation cheese with 10.8% protein and 9.5% modified starch has a melt spread, as measured by a modified Schreiber Melt test (as described in the examples section below), of at least about 30% change in diameter, in embodiments between about 35% change in diameter and about 65% change in diameter, in embodiments between about 35% change in diameter and about 55% change in diameter.

This specification also discloses imitation cheeses using the modified starch that, in addition to quickly setting and melting, have good melt stretch. The cheese stretch derives in part from the gelling properties of the starch, and from the starch a sulfite level a below detection amount of sulfite as measured by titration by the methods describe in the examples.

In embodiments the starch having the above characteristics is made by oxidizing the starch. In embodiments, unmodified potato starch with water and slat to form a slurry. The slurry's pH is increased to basic pH, for example between 11 and 12 by addition of appropriate base. The starch is then oxidized, for example by addition sodium hypochlorite. In embodiments hypochlorite is added sufficient amount to provide between 3.0% and 3.5% active chlorine to the slurry, and in other embodiments about 3.3%. The reaction is run until a test slurry made from oxidized starch has a peak viscosity of between 100 and 220 cP and an end viscosity of between 45 and 100 cP, in embodiments this between 1 and 6 hours, and all subranges, in embodiments about 2 hours. At that point the oxidation reaction is stopped, in embodiments by addition of sulfite. The slurry's pH is reduced to between 4 and 6, and hydrogen peroxide is added to neutralize residual sulfite. The slurry is then dewatered and the oxidized starch can be recovered, washed, and milled for use.

The oxidized starch made according to this method has sulfite below detectable levels per iodometric titration. In embodiments the sulfite level is 0 ppm (as defined in this specification).

The starch disclosed in this specification is derived from potato starch that is not a low or high amylose variant. Generally, the potato starch will have an amylose content of between 10% and 30%, more typically between 15 and 25% by weight, in embodiments about 20%.

In embodiments the starch is modified so that has a level of carboxyl substitution (% d.s.b.) of between about 0.35 and about 0.70, in embodiments between about 0.45 and about 0.60, in embodiments between about 0.50 and about 0.55.

In embodiments the starch is modified so that it has a peak viscosity of between about 100 and 220 cP, in other embodiments between 120 and 200 cP. In embodiments the modified starch can be characterized as having a final viscosity of between 45 and 100 cP, in embodiments between about 50 and 75 cP and in embodiments between 60 and 75 cP.

Various methods in the art are known to modify starch viscosity, such as crosslinking, hydroxypropylation, thermal inhibition, enzymatic hydrolysis (using for example pullulanase or α-amylase), and acid hydrolysis, etc. Additionally, carboxylation can be achieved by acetylating a starch. Oxidation has the benefit of accomplishing viscosity modification, and carboxylation. Additionally combinations of the above reactions may be used.

In an embodiment the potato starch is modified by oxidation. The oxidized starch is not pregelatinized or modified prior to oxidation or further modified after oxidation. As used in this specification a modified starch is a starch that has been subjected to physical (for example heat or sheer), chemical (for example, acid hydrolysis, crosslinking, esterification, etherification), or enzyme (for example pullulanase or α-amylase) treatment to alter the unmodified (also called native) structure and functionality of the starch.

In embodiments the oxidized starch is tested during oxidation to determine when it has achieved the desired viscosity profile. When that viscosity profile is reached, the oxidation reaction is stopped by adding a reducing agent. The starch is then recovered by lowering the slurry's pH to be acidic, neutralizing the reducing agent, and then dewatering the slurry.

More specifically, potato starch is added to water to form a slurry. Salt is added to the slurry to help maintain starch granule integrity during the reaction. Any salt typically used for that purpose is acceptable, for example sodium chloride and sodium sulfate. The slurry's pH is adjusted to between about 11 and about 12. Any suitable base may be used for example sodium hydroxide, sodium carbonate, sodium citrate, tetrasodium pyrophosphate, ammonium orthophosphate, disodium orthophosphate, trisodium phosphate, calcium carbonate, calcium hydroxide, potassium carbonate, potassium hydroxide, and potassium citrate. The bases can also include any other base approved for food use under Food and Drug Administration laws or other food regulatory laws.

The pH is maintained while oxidant is added. Various oxidants may be used, for example, hypochlorite. The oxidation reaction runs until samples of the oxidized starch produce the desired viscosity profile. In embodiments the oxidized starch has a viscosity profile of between about 100 and about 220 cP peak viscosity and between about 45 and about 100 cP end viscosity. In embodiments the peak viscosity is between 120 and 200 cP. In embodiments the end viscosity is between about 50 and about 75 cP, and in other embodiments between about 60 and about 70 cP. After achieving the desired viscosity profile, the reaction is stopped by adding a reducing reagent, for example sulfite. The slurry's pH is reduced to between 4 and 6, and in embodiments about 5. Then the residual sulfite ions are neutralized by oxidation for example by using hydrogen peroxide.

In embodiments the sulfite is removed from the starch granule after recovery.

In embodiments the slurry is tested for the presence of sulfite ion following addition of hydrogen peroxide. In embodiments the level of sulfite in the slurry is 0 ppm as measured by iodometric titration. The titration may run on starch filtrate taken from the above slurry. In other embodiments, sulfite is extracted from recovered oxidized starch.

Modified starches characterized by the above described parameters form thermal-reversible gels when mixed with water in at least 5% by weight, and most typically in range of between 5% and 50%. In embodiments the thermal-reversible gels were made using 20% (d.s.b.) starch-in-water. To make gels the slurry was heated to boiling for between 10 and 20 minutes, and then allowed to cool. The slurry formed a thermal reversible gel after 12 hours at room temperature.

Thermal reversible gels made using the modified potato starch (20% d.s.b.) have a gel strength, as measured by a gel punch test, of at least 100 g, after one day's storage at temperature of 4° C., in embodiments about 150 g, in embodiments about 175 g between 200 and about 300 g. In embodiments the punch test will register at least 275 g after seven days storage at 4° C., in embodiments between 275 g and 450 g, in embodiments between about 300 g and about 400 g.

In embodiments the starch has a gelling time, represented by the time for the elastic modulus, $G'$, of starch-in-water slurry 20% (d.s.b.) to reach at least 100 Pa, of less than 30 min, in embodiments less than about 20 min, in embodiments less than about 10 min, and in embodiment between about 1 and about 10 minutes, in other embodiments between about 3 and 10 minutes.

In embodiments the gel has an onset melting temperature of between about 35° and about 55° C., in embodiments between about 40° and 50° C., in other embodiments between about 42.5° and 47.5° C. In embodiments gel has a completed melting temperature of between about 65° and about 85° C., in embodiments between about 67.5° and about 80° C. in embodiments between 68° and 75° C., and in embodiments between about 69° and 73° C.

In embodiments, imitation cheese having 10.8% protein and 9.5% of the modified starch has melt spread as measured by a modified Schreiber test (as described in the examples) of at least about 30% change in diameter, in embodiments between about 35% change in diameter and about 65% change in diameter, in embodiments between about 35% change in diameter and about 55% change in diameter.

Starch made as describe sulfite levels that are not measurable according to standard iodometric titration as described in the examples, which is defined as having 0 ppm sulfite a below detection amount of sulfite as measured by titration. While not being bound by theory without using the steps to eliminate and ensure the absence of sulfite ions, the sulfite ions remain with the modified starch for example by being trapped in the starch granule or by drying on the surface of the granule.

Eliminating sulfite in the modified starch improves the functionality of imitation cheese, and other applications whose functional characteristics are defined, at least in part, by the conformation of the protein in the food product. Applicants have found that a sulfite level of greater than 0 ppm in the starch will impede, and at levels above 4 ppm prevent, the formation of a functional cheese mass. At levels between 0 ppm and 4 ppm a cheese mass can be made to form using high shear during the mixing process, but the final imitation cheese product has reduced functionality, for example, reduced melt spread and melt stretch. Again, while not being bound by theory, it is believed that disulfide bonds between and among the casein within the imitation cheese are necessary for the cheese mass to form and once formed, for an imitation cheese to melt and spread like real cheese. It is further believed that residual sulfite associated with the starch granule disrupts these disulfide bonds in sufficient amounts to impede (or prevent) the cheese mass from forming and then from functioning like a real cheese upon melting.

Thermal reversible gels are useful in various applications including in imitation cheese, processed cheese, vegan cheese, soup, sauces, gravies, puddings, yogurts, confectionary and candy goods, fruit fillings; cook top melt applications and in applications to replace gelatin or fat.

In embodiments the modified starch makes up between 1% and 50% of the weight of the final product.

In embodiments the modified starch is used in imitation cheeses to replace protein. In embodiments the starch can be used to replace up to 75% of casein (between 1-75%), in embodiments the modified starch is used to replace 60% of casein in the imitation cheese, in embodiments 50%, in embodiments 40%.

Methods for making imitation cheeses are conventional and are well known. Illustrative embodiments combine casein, water, vegetable fat, starch, salt and lactic acid. Casein can make up between 7% and 20% of the imitation cheese. In embodiments imitation cheese was compared to a cheese having 18.50% protein content by weight casein in the cheese. In illustrative embodiments the amount of protein was reduced to 10.8% or 7.2% protein content. In these examples, casein made up 13.50% and 9% of the cheese products respectively. In embodiments the oxidized starch is the sole starch in the imitation cheese. The starch can be used in amounts of up to around 20% of the cheese. In illustrative embodiments imitation cheese having a 40% reduction in casein used 9.50% oxidized starch (moisture of 51.74%), and imitation cheese having 60% reduced casein used 16% oxidized starch (moisture of 50.68%). In these embodiments the oxidized starch can be used in amounts as desired up to about 20%. It is expected that the oxidized starch will be used in amounts of between 5% and 20%. Vegetable fat may come from oil or shortening in amounts of between 20% and 30%, and may come from any commonly used vegetable source for example, corn, sesame seed, cotton seed, safflower, soybean, olive, palm, coconut, etc. Salts are added both to improve emulsification and for flavor. Emulsifying salts, like sodium citrate, phosphates, and tartrate are added in amounts of between 0.5% and 3%. Flavoring salts, like sodium chloride are added in similar percentages, although the total amount of salt in the imitation cheese will typically not exceed about 5%. Lactic acid is added in amounts of less than 1%. Additional flavorings and ingredients commonly used in imitations cheeses may also be used.

The modified starch can also be used in vegan cheeses. In embodiments casein is replaced with modified starch. In embodiments it is replaced with oxidized potato starch. Although the modified starch having the disclosed carboxylation viscosity profile and may be used as the sole replacement for casein, typically other starches, modified and unmodified, are used. Modifications include crosslinking, dextrinization, stabilization (etherification or esterification), pregelatinization. Typical starch bases include tapioca, corn, rice, potato, sago, and waxy variants of these starches. In an illustrative embodiment, in addition to oxidized potato starch, the vegan cheese will use a mixture of other starches. In embodiments the vegan cheese will include a mixture of modified and unmodified starches. An illustrative mix includes tapioca starch (1-10%), maltodextrin (1-10%) and pregelled, OSA-modified waxy corn starch (1-10%), the total weight percentage of the second starch mix in the imitation cheese will range from 5-15%. These ranges include all subranges.

Imitation cheese is typically made by forming an emulsion of casein, starch, water, flavorings, acid, and fat, using the emulsifying salt for stabilization. The mixture is heated during emulsification and the final mass is cooled for several days. The emulsions can be made in standard ways by mixing the ingredients, typically by mixing the dry ingredients and then adding the wet ingredients, and homogenizing. The mixture is cooked at temperatures ranging from about 60° to about 90° C., more typically between about 70° and about 85° C.

In embodiments, imitation cheese using 10.8% protein content had a melt stretch of between about 30 and about 35 centimeters, in embodiments between about 32 and about 34 cm. In embodiments, imitation cheese using 7.20% protein of between 5 and 15 cm, in embodiments between about 7.5 and 12 cm, in embodiments about 10 cm.

The disclosed starch is also useful in processed cheese. Processed cheese is a cheese product made from cheese, cheese curd, or sometimes other unfermented dairy by-products, and mixtures thereof. The dairy products are typically mixed with an emulsifier to improve melting properties of the cheese. Processed cheese may also starch to adjust the texture of the processed cheese in solid and melted states, especially in reduced protein, or reduced fat processed cheeses. The disclosed starch can be used in amount of between 1% and 50% of the final product.

ILLUSTRATIVE EMBODIMENTS

Following are a non-exclusive list of embodiments of the invention:

Aspect 1. A method of oxidizing a starch comprising:
a. mixing unmodified potato starch with water to form a slurry;
b. adding a salt to the slurry;
d. adding a base to the slurry in sufficient amount to increase the pH of the slurry to between 11 and 12;
e. adding oxidizer to the slurry to oxidize the starch until a test slurry using the oxidized starch has a final viscosity between 45 and 100 cP;
f. adding sufficient reducing agent to the slurry to neutralize the oxidation reaction;
g. adding sufficient acid to reduce the pH of the slurry to about 5.0;
h. adding oxidizing agent to the slurry in sufficient amount to neutralize residual reducing reagent in the slurry;
i. dewatering the starch slurry.

Aspect 2. The method of aspect 1 further comprising adding sodium hypochlorite as the oxidizer of step e) in sufficient amount to supply between 3.0 and 3.5% active chlorine (d.s.b.).

Aspect 3. The method of aspect 1 further comprising adding sodium hypochlorite as the oxidizer of step e) in sufficient amount to supply 3.3% active chlorine (d.s.b.).

Aspect 4. The method of aspect 1 wherein step e) is run for two hours.

Aspect 5. The method of any of aspect 1 through 4 wherein the peak viscosity of the test sample of step e) is between 100 and 220 cP.

Aspect 6. The method of aspect 5 further comprising testing the slurry after step h) to verify that the sulfite level in a the slurry is 0 ppm.

Aspect 7. A starch made according to the process of any of aspects 1 through 6.

Aspect 8. The starch of aspect 7 characterized by a carboxylation of between 0.35% and 0.70%, (d.s.b.), having a peak viscosity of between 120 and 200 cP and a final viscosity of between 60 and 75 cP.

Aspect 9. The starch of aspect 7 characterized by a carboxylation of between 0.50% and 0.55% (d.s.b.)

Aspect 10. A starch characterized by a carboxylation of between 0.35% and 0.70%, (d.s.b.), a peak viscosity of between 100 and 220 cP, a final viscosity of between 45 and 100 cP, and a sulfite level of 0 ppm.

Aspect 11. The starch of aspect 10 characterized by a carboxylation of between 0.50% and 0.55%, (d.s.b.), having a peak viscosity of between 120 and 200 cP and a final viscosity of between 60 and 75 cP.

Aspect 12. A thermal-reversible gel made from the starch of any of aspects 7 through 11.

Aspect 13. The thermal-reversible gel of aspect 12 further characterized by an onset melting temperature of between 35° and 55° C. and a complete melting temperature of between 65° C. and about 85° C.

Aspect 14. The thermal-reversible gel of aspect 12 wherein a test gel of 20% (d.s.b.) a gelling rate of less than 30 minutes, a gel firmness of at least 200 g after 24 hours storage 4o.

Aspect 15. A foodstuff comprising the starch of any of aspects 7 through 11.

Aspect 16. The foodstuff of aspect 15 wherein the starch is used in sufficient amounts to form a thermal-reversible gel.

Aspect 17. An imitation cheese comprising:
- a) the starch of any of aspects 7 through 11 in amount of between 7.5% and 20%, by weight of the imitation cheese;
- b) a casein in the amount of between 7% and 15% by weight of the imitation cheese; and
- c) a vegetable fat in the amount of between 10 and 20% by weight of the imitation cheese.

Aspect 18. The imitation cheese of aspect 17 further characterized by a melt spread of between 20% and 70% change in diameter.

Aspect 19. The imitation cheese of aspect 17 further characterized by a melt spread of between 35% and 55% change in diameter.

Aspect 20. The imitation cheese of aspect 17 wherein a test imitation cheese made from 10.8% of the starch has a melt stretch of between 30 and 35 cm.

Aspect 21. A vegan cheese comprising:
- a) a first starch in amount of between 7.5% and 20% by weight of the vegan cheese, the starch being the starch of any of aspect 7 through 11;
- b) a second starch;
- c) a vegetable fat in the amount of between 10% and 20% by weight of the vegan cheese.

Aspect 22. The vegan cheese of aspect 21 wherein the second starch is tapioca starch.

Aspect 23. The vegan cheese of aspect 22 further comprising a third starch being a modified starch that is different than the modified starch of element a), and a dextrin Aspect 24. The vegan cheese of aspect 23 wherein the third starch is a pregelatinized, OSA-modified waxy corn starch.

Aspect 25. The vegan cheese of aspect 24 wherein the dextrin, second starch, and third starch are used in an amount of between 5% and 15% by weight of the vegan cheese.

Aspect 26. A foodstuff comprising:
- a) a modified starch characterized by a starch characterized by a carboxylation of between 0.35% and 0.70%, (d.s.b.), a peak viscosity of between 100 and 220 cP, a final viscosity of between 45 and 100 cP; and
- b) a second edible ingredient;

wherein the foodstuff has 0 ppm sulfite.

Aspect 27. The foodstuff of aspect 26 being selected from the group consisting of processed cheese, imitation cheese, vegan cheese, soup, sauces, gravies, puddings, yogurts, confectionary and candy goods, fruit fillings; cook top melt applications and in applications to replace gelatin or fat.

Aspect 28. The foodstuff of aspect 26 being an imitation cheese and further comprising:
- a) 7.5% and 20% of the modified starch, by weight of the imitation cheese;
- b) a casein in the amount of between 7% and 15% by weight of the imitation cheese; and
- c) a vegetable fat in the amount of between 10 and 20% by weight of the imitation cheese.

Aspect 29. The imitation cheese aspect of 28 further characterized by a melt spread of between 20% and 70% change in diameter.

Aspect 30. The imitation cheese of aspect 28 further characterized by a melt spread of between 35% and 55% change in diameter.

Aspect 31. The imitation cheese of aspect 28 wherein a test imitation cheese made from 10.8% of the starch has a melt stretch of between 30 and 35 cm.

Aspect 32. The foodstuff of aspect 26 being a vegan cheese and further comprising:
- a) 7.5% and 20% of the modified starch by weight of the vegan cheese,
- b) a second starch;
- c) a vegetable fat in the amount of between 10% and 20% by weight of the vegan cheese.

Aspect 33. The vegan cheese of aspect 32 wherein the second starch is tapioca starch.

Aspect 34. The vegan cheese of aspect 32 further comprising a third starch being a modified starch that is different than the modified starch of element a), and a dextrin Aspect 35. The vegan cheese of aspect 32 wherein the third starch is a pregelatinized, OSA-modified waxy corn starch.

Aspect 36. The vegan cheese of aspect 32 wherein the dextrin, second starch, and third starch are used in an amount of between 5% and 15% by weight of the vegan cheese.

Aspect 37. A method of making a thermal reversible gelling potato starch comprising:
- a) modifying the a potato starch so that it has a peak viscosity of between 100 and 220 cP and an end viscosity of between 45 and 100 cP.
- b) adjusting the carboxylation level of the potato starch to be between 0.35% and 0.70% (d.s.b.);
- c) removing sulfite from the viscosity modified, carboxylation adjusted potato starch so that the starch has 0 ppm sulfite.

Aspect 38. A method of oxidizing a starch comprising:
- a. mixing unmodified starch with water to form a slurry;
- b. adding a salt to the slurry;
- d. adding a base to the slurry in sufficient amount to increase the pH of the slurry to between 11 and 12;
- e. adding oxidizer to the slurry to oxidize the starch until a test slurry using the oxidized starch has a final viscosity between 45 and 100 cP;
- f. adding sufficient reducing agent to the slurry to neutralize the oxidation reaction;
- g. adding sufficient acid to reduce the pH of the slurry to about 5.0;
- h. adding oxidizing agent to the slurry in sufficient amount to neutralize residual reducing reagent in the slurry;
- i. dewatering the starch slurry.

Aspect 39. A thermal reversible gel made from the starch made according to the process of aspect 38.

Aspect 40. A foodstuff made from the starch made according to the process of aspect 38.

DEFINITIONS

Gelling rate, as used in this specification, is the amount of time in minutes for the elastic modulus of the gel to reach at least 100 Pa. Gelling rate is measured as described in the examples section.

Onset gel melting temperature, as used in this specification, is the temperature at which the elastic modulus, G', drops to 0.95 power of the beginning value for the gel (i.e. loss of 5% value in log scale).

Completed gel melting temperature, as used in this specification, is the temperature at which the elastic modulus, G', drops to 5% of the beginning value (i.e. loss of 95% of G').

Melt spread, as used in this specification, means the percent change in the average diameter of a 5 mm tall cheese slice that has an initial diameter 35.5 mm after the slice has been melted by baking for 5 minutes at 450° F. according to the methods described in the examples section.

Melt stretch, as used in this specification, means the breakage length of a cheese string measured during a slow (about 1 inch per second or slower) vertical pull of cheese from a pizza. Using a test imitation cheese having 10.8% modified starch, melt stretch was tested on a pizza as follows: 80 g shredded cheese was spread over 60 g commercial tomato sauce, which was on top of pre-cooked pizza dough; the pizza was then cooked at about 225° C. (435° F.) for 5 minutes in a forced air pizza oven.

Imitation cheese, as used in this specification, is a cheese-like product comprising oil (or other non-dairy fat) and at least one emulsifier in addition to or as a substitute for dairy components in the imitation cheese product. An imitation cheese may comprise casein, or its derivatives. It may also contain one or more starches or modified starches as an additive to the imitation cheese or as a substitute for casein, or other dairy components, in the imitation cheese.

Vegan cheese, as used in this specification, is an imitation cheese comprising no animal protein, or animal products of any kind.

Peak viscosity, as used in this specification, means the highest viscosity reached by a starch slurry (20% solids in slurry, deionized water having 0.1% NaCl) measured over the following time/temperature course: 35° C. for 30 seconds, ramp up to 92° C. in 4.75 minutes, hold at 92° C. for 3 minutes, ramp down to 35° C. in 3.75 minutes, and hold at 35° C. for 3 minutes. The RVA runs at 160 rpm for all steps.

Final (or end) viscosity, as used in this specification, is the viscosity measured after the starch slurry (20% solids in slurry, deionized water having 0.1% NaCl) completes the following time/temperature course: 35° C. for 30 seconds, ramp up to 92° C. in 4.75 minutes, hold at 92° C. for 3 minutes, ramp down to 35° C. in 3.75 minutes, and hold at 35° C. for 3 minutes. The RVA runs at 160 rpm for all steps.

As used in this specification, 0 ppm sulfite ion means an amount of sulfite a below detection as measured by titration using 0.01 N iodine by the method described in the examples section.

All percentages are by weight on a dry starch basis unless otherwise said.

The following examples are provided as illustrations and should not be construed to limit the scope of the invention in any way. Persons of ordinary skill in the art will recognize that routine modifications may be made to the methods and materials used in the examples, which would still fall within the spirit and scope of the present invention.

PROCEDURES

Oxidized Starch Evaluation:

Viscosity: For RVA: Samples were run on RVA Super 4 (Perten) over the following time and temperature profile: 35° C. for 30 seconds, ramp up to 92° C. in 4.75 minutes, hold at 92° C. for 3 minutes, ramp down to 35° C. in 3.75 minutes, and hold at 35° C. for 3 minutes. All samples were done in deionized water having 0.1% NaCl content added and with 20% starch solids (28 g total). The paddle speed was 160 rpm for all steps and samples.

Carboxylation levels: the carboxyl content of each sample was determined by mixing 5 g of starch in 0.1 N HCl for 30 minutes. The slurry was filtered and the starch washed adequately with deionized water until the filtrate showed negative for chloride ions with a few drops of silver nitrate. The starch was suspended in 100 mL of deionized water at room temperature, then mixed with 200 mL of deionized water at 90° C., and placed into a boiling water bath and stirred for ten minutes. After that time, the samples were titrated to a phenolphthalein end point with 0.1 N NaOH. Calculations corrected for the moisture of the starch so that all values are reported on anhydrous starch basis and for the carboxyl present in the blank (unmodified base material). The calculation for the % Carboxyl (d.s.b.) is as follows:

$$\% \text{ Carboxyl}(d.s.b) = \left(\left[\frac{V_{NaOH}}{W_{starch} \times 1 - \frac{M_{starch}}{100}}\right]_{sample} - \left[\frac{V_{NaOH}}{W_{starch} \times 1 - \frac{M_{starch}}{100}}\right]_{Blank}\right) \times 0.45.$$

Where: V=the amount of 0.1 N NaOH in milliliters used to reach a phenolphthalein pink endpoint; W=the weight of the starch in grams; M=the moisture of the starch in percentage; Sample=values measured for the modified sample; and Blank=values measured for the unmodified base material.

Gelling rate: Starch slurry at 20% solids in pH 6 buffer was cooked at 98° for 20 min. The rheology properties of cooked sample were measured using an AR-G2 Rheometer (TA Instruments). The parallel plate (40 mm) was preset at 90° C. The cooked starch solution was loaded on plates immediately after cooking with a gap of 1 mm. After loading, the sample was sealed with silicone oil to prevent evaporation. The gelation process was measured by monitoring elastic modulus, G', increase at a frequency of 1 rad/s and strain of 0.08% during temperature ramp from 90° to 4° C. at 20° C./min and then during time sweep at 4° C. for 1 hr. Gelling rate was represented by time at which G' reached >100 Pa.

Gel melt: Gel melt properties were measured by monitoring G' decrease during temperature ramp from 4° to 90° C. at 20° C./min. The temperature at which G' dropped to 0.95 power of the beginning value (i.e. loss of 5% value in log scale) was recorded as the onset melting temperature. The temperature at which G' dropped to 5% of the beginning value (loss of 95% value in normal scale) was recorded as the complete melting temperature.

Gel firmness: Starch gel firmness was measured using a punch test with a TA-XT Plus Texture Analyzer. Starch slurry (20% starch d.s.b.) was cooked at 98° for 20 min. was poured into 1 oz jars and stored at 4° C. for 1 or 7 days. A 5 mm sphere probe (TA-8B) was used to punch 15 mm depth of gel for gel firmness. Samples were taken out from the refrigerator just before testing so the gels were still at the refrigerated temperature during measurement. Parameters of the test were as follows: Probe: 5 mm sphere probe (TA-8A); Trigger force: 2 g; Test speed: 1 mm/sec (6 cm/min); Test distance: 15 mm. Gel firmness was represented using maximum punch force determined during the test.

Sulfite measurements: Sulfite ion/sulphur dioxide is measured via iodometric titration of sulfite extracted from starch slurry. The sulfite is extracted from starch by suspending the starch in deionized water (total sample is 100 mL). The starch slurry contains about 10% starch by weight. The slurry is mixed for about 1 minute and allowed to rest until the starch settles (about 9 minutes). The slurry is filtered and the filtrate is titrated with 0.01 N iodine, which is added dropwise to the filtrate using a burette. The volume of iodine used to titrate the filtrate is read, and sulfite concentration is calculated according to the formula: ppm $SO_2$=(ml 0.01 N iodine titrated into filtrate−ml 0.01 N iodine titrated into blank)×28.80, where the blank is a control sample of deionized water. If the first drop of added iodine turns the solution light blue, the level of sulfite ions is below detection, and is defined as 0 ppm. If the second drop of added iodine turns the solution blue, there is a measurable amount of sulfite ions and the amount is recorded to be greater than 0 ppm, and can be specifically calculated.

Cheeses Were Evaluated by the Following Methods Which are Standard to Industry:

pH Measurement: A spear tip cheese probe was used to measure the sample final pH. Target pH is 5.8

Moisture Analysis: Smart CEM 5% Moisture Analyzer at 130° C. and 100% power was used to measure the moisture of a 2.5 g sample using the Processed Cheese Program in duplicate.

Modified Schreiber Melt Test: A 35.5 mm diameter borer was used to isolate a cheese sample having height of 5 mm. Cheese discs were placed in a covered 100×15 mm Pyrex petri dish atop an aluminum plate and baked for 5 minutes in a 450° F. oven. The average diameter of the cheese disc was measured before and after baking using calipers. Each sample was evaluated in duplicate. Results are shown as average % change in diameter.

Example 1—Rheology

Rheological testing measured gelling rate versus level of carboxylation, melt spread versus carboxylation, gel firmness over time, as well as viscosity of samples.

Table 1 lists the relevant variation of reaction conditions of samples tested. As shown the study varied reaction pH, maintenance of pH, active chlorine dosage, reaction time and whether pH was maintained throughout the reaction.

TABLE 1

| Sample | Reaction pH | Active Chlorine Dosage | Reaction Time | Maintained pH |
|---|---|---|---|---|
| 1080-00-0 | | Commercially Avalable Oxidized Potato Starch | | |
| 1080-48-2 | 11 | 2.4 | 2 | Yes |
| 1080-48-4 | 11 | 2.4 | 4 | Yes |
| 1080-49-2 | 11 | 4.2 | 2 | Yes |
| 1080-49-6 | 11 | 4.2 | 6 | Yes |
| 1080-50-2 | 11 | 3.3 | 2 | Yes |
| 1080-50-4 | 11 | 3.3 | 4 | Yes |
| 1080-50-6 | 11 | 3.3 | 6 | Yes |
| 1080-49-8 | 11 | 4.2 | 8 | Yes |
| 1080-51-2 | 10 | 4.2 | 2 | Yes |
| 1080-51-4 | 10 | 4.2 | 4 | Yes |
| 1080-51-6 | 10 | 4.2 | 6 | Yes |
| 1080-52-6 | 9 | 4.2 | 6 | Yes |
| 1080-53-6 | 11 | 4.2 | 6 | No |
| 1080-54-2 | 11 | 4.2 | 2 | No |
| 1080-54-6 | 11 | 4.2 | 6 | No |
| 1080-57-4 | 9.6 | 4 | 4 | Yes |
| 1080-57-6 | 9.6 | 4 | 6 | Yes |
| 437-22 | 11 | 3.3 | 2 | Yes |
| 437-24 | 11 | 3.3 | 2 | Yes |
| 437-25 | 11 | 3.3 | 2 | Yes |

Table 2 reports the rheological properties of the gel. End viscosity is the viscosity of the starch at 35° C. after the time and temperature course described above is completed. Viscosity is measured in cP. The gel strength is measured by punch tests. It is reported in grams and measurements were made after 1 day's storage age 4° C. Gel rate, is the time for the elastic modulus G' to reach greater than 100 Pa. Carboxylation is measured in percent carboxylation on a corrected dry starch basis.

TABLE 2

| Sample | End Viscosity (of Starch slurry (cP)) | Carboxylation (of Starch % d.s.b. corrected) | Gel Strength (g) | Time (Min) for Gel G' to Reach >100 Pa | Modified Schreiber Melt of Imitation Cheese using Casein (% change in diameter) |
|---|---|---|---|---|---|
| 1080-00-0 | 46 | 0.98 | 10.04 | | 60.18 |
| 1080-48-2 | 558 | 0.38 | 452.8 | 3.9 | 34.99 |
| 1080-48-4 | 420 | 0.38 | 502.67 | 4.1 | 29.19 |
| 1080-49-2 | 28 | 0.64 | 197.83 | 4.1 | 44.18 |
| 1080-49-6 | 16 | 0.68 | 170.34 | 11.4 | 46.98 |
| 1080-50-2 | 93 | 0.48 | 423.30 | 4.3 | 47.76 |
| 1080-50-4 | 47 | 0.52 | 324.49 | 3.7 | 31.87 |
| 1080-50-6 | 61 | 0.52 | 300.42 | 5.0 | 37.77 |
| 1080-51-2 | 66 | 0.81 | 113.69 | 26.0 | 43.09 |
| 1080-51-4 | 43 | 0.90 | 85.41 | 24.9 | 63.17 |
| 1080-51-6 | 45 | 0.94 | 75.68 | 36.1 | 32.92 |
| 1080-52-6 | 192 | 1.11 | 67.76 | >65 | 40.77 |
| 1080-53-6 | 125 | 0.84 | 49.14 | 33.1 | 23.85 |
| 1080-54-2 | 49 | 0.57 | 225.00 | 6.9 | 42.71 |
| 1080-54-6 | 27 | 0.67 | 126.85 | 12.0 | 55.33 |
| 1080-57-4 | 82 | 0.889 | 129.63 | 59.5 | 42.3 |
| 1080-57-6 | 52 | 0.937 | 109.81 | 31.0 | 53.6 |
| 437-22 | 69 | 0.507 | 203.76 | 6.0 | 44.12 |
| 437-24 | 61 | 0.524 | 232.95 | 6.9 | 53.57 |
| 437-25 | 65 | 0.533 | 216.52 | 9.5 | 39.07 |

As shown in Table 1, carboxylation and end viscosity differ depending on reaction conditions. Additionally, Table 2 shows that combination of carboxylation and end viscosity affect the rheological properties of the gel. For the preferred usage as a starch in an imitation cheese, the cheese must have good firmness (at least around 200 g) in order to shred well. The cheese must gel quickly upon cooling (reaching of elastic modulus, G', of greater than 100 Pa in 30 minutes or less) for easy handling during processing. And the gel must melt well upon reheating (spread of at least 20% increase in diameter).

As shown these properties are achieved by preparing starch under conditions so that a test slurry made using 20% solids has an end viscosity of between 45 and 100 cP, but preferably between 60 and 75 cP. Additionally, as shown the starch has a carboxylation level of between 0.35 and 0.75%, and preferably between 0.50 and 0.55% on a d.s.b.

Table 3 reports rheological properties of four gels made from commercially available samples compared to embodiments of the disclosed oxidized starch.

TABLE 3

| Product | Concentration | Gel Firmness (g) (1 day) |
|---|---|---|
| Experimental Oxidized Potato Starch | 0.20 | 203.8-324.5 |
| Commecially Available Acid Hydrolyzed Acetylated Potato | 0.20 | 126.5 |
| Commercially Available Oxidized Potato | 0.20 | 30.3 |
| Commecially Available Potato Maltodextrin (Enzyme Hydrolyzed Potato) | 0.20 | 63.8 |
| Commercially Available Acid Hydrolyzed Waxy Potato | 0.20 | 130.3 |

Example 2—Cheese Tests

Imitation Cheese: was tested at 60% and 40% protein reduction levels. Full casein control cheeses were made using 18.5% protein so the test formulations used 10.8% protein and 7.2% protein, respectively

TABLE 4

10.8% Protein Formula

| Ingredients | Percent | % Protein | % MSNF | % Fiber | % Fat | % Solids |
|---|---|---|---|---|---|---|
| Rennet Casein (Fonterra 90#) | 13.50 | 10.80 | 12.22 | 0.00 | 0.15 | 12.42 |
| Water | 48.00 | 0.00 | 0.00 | 0.00 | 0.00 | 0.00 |
| Vegetable Fat (Loders Krokland Sans Trans 39) | 26.00 | 0.00 | 0.00 | 0.00 | 25.48 | 25.48 |
| Starch | 9.50 | 0.05 | 0.00 | 0.00 | 0.01 | 7.60 |
| Emulsifying Salt (ICL Foods JOHA PZ7) | 1.20 | 0.00 | 0.00 | 0.00 | 0.00 | 1.14 |
| Salt | 1.50 | 0.00 | 0.00 | 0.00 | 0.00 | 1.35 |
| Lactic Acid (Purac FCC 88) | 0.30 | 0.00 | 0.00 | 0.00 | 0.00 | 0.27 |
| Total | 100.00 | 10.85 | 12.22 | 0.00 | 25.64 | 48.26 |

\* Total Starch 9.50%; Casein Reduction 0.4; Moisture 51.74%

TABLE 5

7.2%% Protein Formula

| Ingredients | Percent | % Protein | % MSNF | % Fiber | % Fat | % Solids |
|---|---|---|---|---|---|---|
| Rennet Casein (Fonterra 90#) | 9.00 | 7.20 | 8.15 | 0.00 | 0.10 | 8.28 |
| Water | 46.00 | 0.00 | 0.00 | 0.00 | 0.00 | 0.00 |
| Vegetable Fat (Loders Krokland Sans Trans 39) | 26.00 | 0.00 | 0.00 | 0.00 | 25.48 | 25.48 |
| Starch | 16.00 | 0.08 | 0.00 | 0.00 | 0.02 | 12.80 |
| Emulsifying Salt (ICL Foods JOHA PZ7) | 1.20 | 0.00 | 0.00 | 0.00 | 0.00 | 1.14 |
| Salt | 1.50 | 0.00 | 0.00 | 0.00 | 0.00 | 1.35 |
| Lactic Acid (Purac FCC 88) | 0.30 | 0.00 | 0.00 | 0.00 | 0.00 | 0.27 |
| Total | 100.00 | 7.28 | 8.15 | 0.00 | 25.60 | 49.32 |

\* Total Starch 16.00%; Casein Reduction 0.6; Moisture 50.68%

Pizza Bake Test

Spread 60 g Traditional Pizza Sauce on 8" Pizza Crust (pre-cooked as for example sold by Boboli®) and topped with 80 g shredded cheese. Pizza was baked at about 225° C. (435° F.) for 5.5 minutes. Cheese was tested for stretch using the following procedure. Fork Test: Insert a fork at a 45° angle into the center of the pizza and lifted slowly (vertically). The distance at which the cheese strand breaks was recorded. Results are reported in Table 6.

TABLE 6

| Ingredient | Protein Content (%) | Stretch (cm) |
|---|---|---|
| Control-no starch | 18.5 | 38.10 |
| Experimental Oxidized | 10.8 | 33.02 |
| Potato Starch | 7.20 | 10.16 |
| Commercially Avaiable | 10.8 | 27.94 |
| Oxidized Potato Starch | 7.20 | 2.54 |
| Commercially Available Acid Hydrolyzed | 10.8 | 7.62 |
| Acetylated Potato Starch | 7.20 | 0 |
| Commercially Available Instant,- OSA, Enzyme modified | 10.8 | 2.54 |
| Waxy Corn Starch | 7.20 | 0 |

What is claimed is:

1. A starch comprising: a carboxylation of between 0.35% and 0.70%, (d.s.b.), a peak viscosity of between 100 and 220 cP, a final viscosity of between 45 and 100 cP, and a sulfite level of 0 ppm.

2. The starch of claim 1 comprising: a carboxylation of between 0.50% and 0.55%, (d.s.b.), having a peak viscosity of between 120 and 200 cP and a final viscosity of between 60 and 75 cP.

3. A foodstuff comprising the starch of claim 1.

4. The foodstuff of claim 3 wherein the starch is used in sufficient amounts to form a thermal-reversible gel.

5. The foodstuff of claim 3 being selected from the group consisting of processed cheese, imitation cheese, vegan cheese, soup, sauces, gravies, puddings, yogurts, confectionary and candy goods, fruit fillings; cook top melt applications and in applications to replace gelatin or fat.

6. The foodstuff of claim 3 being an imitation cheese and further comprising:
 a) 7.5% and 20% of the modified starch, by weight of the imitation cheese;
 b) a casein in the amount of between 7% and 15% by weight of the imitation cheese; and
 c) a vegetable fat in the amount of between 10 and 20% by weight of the imitation cheese.

7. The foodstuff of claim 3 further comprising a melt spread of between 20% and 70% change in diameter.

8. The foodstuff of claim 3 further comprising a melt spread of between 35% and 55% change in diameter.

9. The foodstuff of claim 3 comprising wherein a test imitation cheese made from 10.8% of the starch has a melt stretch of between 30 and 35 cm.

10. The foodstuff of claim 3 being a vegan cheese and further comprising:
 a) 7.5% and 20% of the modified starch by weight of the vegan cheese,
 b) a second starch;
 c) a vegetable fat in the amount of between 10% and 20% by weight of the vegan cheese.

\* \* \* \* \*